US011816511B1

(12) United States Patent
Karis et al.

(10) Patent No.: US 11,816,511 B1
(45) Date of Patent: Nov. 14, 2023

(54) VIRTUAL PARTITIONING OF A SHARED MESSAGE BUS

(71) Applicant: Splunk Inc., San Francisco, CA (US)

(72) Inventors: Steven Karis, Redwood City, CA (US); Maxime Petazzoni, San Mateo, CA (US); Matthew William Pound, Reno, NV (US); Charles Smith, Durham, NC (US); Chengyu Yang, Menlo Park, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 18/176,381

(22) Filed: Feb. 28, 2023

Related U.S. Application Data

(63) Continuation of application No. 17/033,253, filed on Sep. 25, 2020, now Pat. No. 11,620,164.

(51) Int. Cl.
*G06F 9/50* (2006.01)
*G06F 9/48* (2006.01)
*G06F 9/54* (2006.01)
*G06F 11/34* (2006.01)
(Continued)

(52) U.S. Cl.
CPC .......... *G06F 9/5077* (2013.01); *G06F 9/4881* (2013.01); *G06F 9/505* (2013.01); *G06F 9/5083* (2013.01); *G06F 9/542* (2013.01); *G06F 11/3466* (2013.01); *G06F 11/34* (2013.01); *G06F 11/364* (2013.01); *G06F 11/3636* (2013.01); *G06F 16/24568* (2019.01)

(58) Field of Classification Search
None
See application file for complete search history.

(56) References Cited

U.S. PATENT DOCUMENTS

| 7,937,344 B2 | 5/2011 | Baum et al. |
| 8,112,425 B2 | 2/2012 | Baum et al. |
| 8,751,529 B2 | 6/2014 | Zhang et al. |
| (Continued) | | |

FOREIGN PATENT DOCUMENTS

WO    WO-2020177854 A1 *  9/2020 ............ G06F 11/079

OTHER PUBLICATIONS

Marcu et al., "KerA: Scalable Data Ingestion for Stream Processing", 2018, IEEE, pp. 1480-1485. (Year: 2018).*
Kreps et al., "Kafka: a Distributed Messaging System for Log Processing", 2011, ACM. (Year: 2011).*
Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
(Continued)

*Primary Examiner* — Qing Yuan Wu
(74) *Attorney, Agent, or Firm* — McDermott Will & Emery LLP

(57) ABSTRACT

According to embodiments, a method for virtual partitioning of data includes receiving a data stream comprising a plurality of traces, each trace comprising a plurality of spans from a plurality of users. The method also includes assigning the plurality of traces of the data stream to a plurality of virtual partitions based on each user of the plurality of users, each virtual partition of the plurality of virtual partitions comprising data of a user of the plurality of users. The method also includes scheduling at least a subset of the plurality of virtual partitions to at least one user partition of a shared topic, the at least one user partition comprising data from at least one virtual partition of at least one user of the plurality of users. The method also includes indexing each user partition of the shared topic based on each user and each virtual partition.

20 Claims, 6 Drawing Sheets

(51) Int. Cl.
  *G06F 11/36* (2006.01)
  *G06F 16/2455* (2019.01)

(56) References Cited

U.S. PATENT DOCUMENTS

| | | |
|---|---|---|
| 8,788,525 B2 | 7/2014 | Neels et al. |
| 9,215,240 B2 | 12/2015 | Merza et al. |
| 9,286,413 B1 | 3/2016 | Coates et al. |
| 10,127,258 B2 | 11/2018 | Amas et al. |
| 2017/0242887 A1 | 8/2017 | Zhao |
| 2017/0242889 A1 | 8/2017 | Zhao |
| 2019/0098106 A1 | 3/2019 | Mungel et al. |
| 2021/0144440 A1 | 5/2021 | Li |

OTHER PUBLICATIONS

Splunk Quick Reference Guide, updated 2019, available online at https://www.splunk.com/pdfs/solution-guides/splunk-quick-reference-guide.pdf, retrieved May 20, 2020.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

\* cited by examiner

VIRTUAL PARTITIONING OF A SHARED MESSAGE BUS

CROSS REFERENCE TO RELATED APPLICATIONS

This present application claims the benefit of priority under 35 U.S.C. § 120 as a continuation of U.S. patent application Ser. No. 17/033,253, filed Sep. 25, 2020, now allowed, the disclosure of which is hereby incorporated by reference in its entirety for all purposes.

TECHNICAL FIELD

The present disclosure generally relates to data partitioning, and more particularly to virtual partitioning of a shared message bus.

BACKGROUND

Cloud computing provides users access to on-demand computer system resources, such as data storage and computing power, without direct active management by the users. It is a powerful tool that has allowed software providers to efficiently and effectively distribute software services to end users. Software as a service (SaaS) is an example of cloud computing where a software provider's applications are accessible to users as on-demand software through a web browser or a program interface.

BRIEF SUMMARY

Embodiments of the present disclosure provide for systems and methods for virtual partitioning of a shared message bus. According to embodiments, a KAFKA topic in a multi-tenant environment is virtually partitioned such that data from a particular customer may be limited to a particular partition of a shared topic. This allows for having multiple customers on a single topic, if the customers' scales are sufficiently small. In cases of larger customers, they may have their own topic(s), based on the customers' scales.

According to embodiments of the present disclosure, a computer-implemented method for virtual partitioning of data is provided. The method includes receiving a data stream comprising a plurality of traces, each trace comprising a plurality of spans from a plurality of users. The method also includes assigning the plurality of traces of the data stream to a plurality of virtual partitions based on each user of the plurality of users, each virtual partition of the plurality of virtual partitions comprising data of a user of the plurality of users. The method also includes scheduling at least a subset of the plurality of virtual partitions to at least one user partition of a shared topic, the at least one user partition comprising data from at least one virtual partition of at least one user of the plurality of users. The method also includes indexing each user partition of the shared topic based on each user and each virtual partition.

According to one embodiment of the present disclosure, a system for virtual partitioning of data is provided. The system may include at least one memory having instructions stored thereon. The system may also include at least one processor configured to execute the instructions, wherein at least one processor is configured to receive a data stream comprising a plurality of traces, each trace comprising a plurality of spans from a plurality of users. The processor may further be configured to assign the plurality of traces of the data stream to a plurality of virtual partitions based on each user of the plurality of users, each virtual partition of the plurality of virtual partitions comprising data of a user of the plurality of users. The processor may further be configured to schedule at least a subset of the plurality of virtual partitions to at least one user partition of a shared topic, the at least one user partition comprising data from at least one virtual partition of at least one user of the plurality of users. The processor may further be configured to index each user partition of the shared topic based on each user and each virtual partition.

According to one embodiment of the present disclosure, non-transitory computer-readable storage medium comprising instructions stored thereon, which when executed by one or more processors, cause the one or more processors to perform operations for virtual partitioning of data. The operations may include receiving a data stream comprising a plurality of traces, each trace comprising a plurality of spans from a plurality of users. The operations may also include assigning the plurality of traces of the data stream to a plurality of virtual partitions based on each user of the plurality of users, each virtual partition of the plurality of virtual partitions comprising data of a user of the plurality of users. The operations may also include scheduling at least a subset of the plurality of virtual partitions to at least one user partition of a shared topic, the at least one user partition comprising data from at least one virtual partition of at least one user of the plurality of users. The operations may also include indexing each user partition of the shared topic based on each user and each virtual partition.

According to one embodiment of the present disclosure, a system is provided that includes means for storing instructions, and means for executing the stored instructions that, when executed by the means, causes the means to perform a method for virtual partitioning of data. The method includes receiving a data stream comprising a plurality of traces, each trace comprising a plurality of spans from a plurality of users. The method also includes assigning the plurality of traces of the data stream to a plurality of virtual partitions based on each user of the plurality of users, each virtual partition of the plurality of virtual partitions comprising data of a user of the plurality of users. The method also includes scheduling at least a subset of the plurality of virtual partitions to at least one user partition of a shared topic, the at least one user partition comprising data from at least one virtual partition of at least one user of the plurality of users. The method also includes indexing each user partition of the shared topic based on each user and each virtual partition.

BRIEF DESCRIPTION OF THE DRAWINGS

The present disclosure is illustrated by way of example, and not limitation, in the figures of the accompanying drawings, in which like reference numerals indicate similar elements and in which.

DETAILED DESCRIPTION

Figure 1:
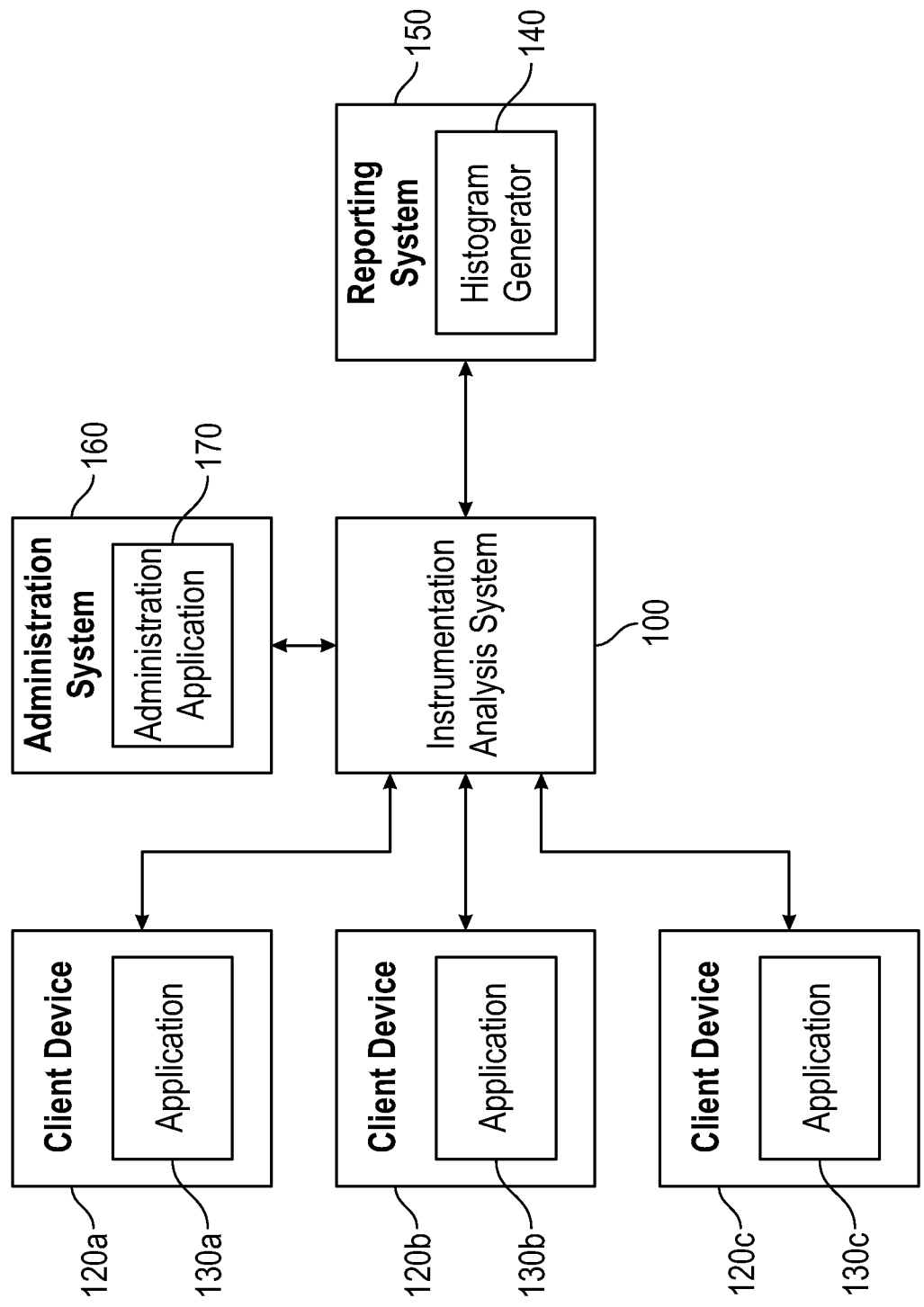
FIG. 1 shows an overall system environment for reporting based on instrumented software, according to an embodiment of the present disclosure.

Trace and Span Sampling and Analysis for Instrumented Software

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The term "trace" as used herein generally refers to a record of the manner in which a single user request, also referred to as a transaction, propagates from one microservice (hereinafter, interchangeably, referred to as "service") to the next in a distributed application. A transaction is generally described as an end-to-end request-response flow, from the making of the user's initial request to receiving the final response. A transaction often involves the interaction of multiple services. A trace is a record of a transaction, and each trace may be identified using a unique trace identifier ("Trace ID"). The trace follows the course of a request or transaction from its source to its ultimate destination in a distributed system. A trace, in one embodiment, may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans, where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags). The annotations and attributes can describe and contextualize the work being done under a span.

The term "tags" as used herein generally refers to key: value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g. tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Service-level tags" generally represent a non-global property of the service or the infrastructure that the associated span (which served a portion of the request) executed on, e.g., service version, host name, region, etc. Spans that executed on different services may have different values for the same tag, e.g. tag "region" may take different values in two services: a span in Service A may be attributed to "region:east" and a span in Service B attributed to "region: west". Also, multiple instances of the same service can serve different parts of the request and so the same service may be associated with different service-level tags in relation to those different parts.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "metric" as used herein generally refers to a single quantifiable measurement at a specific point in time. Combining the measurement with a timestamp and one or more metadata objects (also referred to herein as "dimensions") results in a metric data point. A single metric data point may include multiple measurements and multiple dimensions. Metrics are used to track and assess the status of one or more processes. A metric typically comprises a numeric value that is stored as a time series.

A "topic" as used herein generally refers to a category and/or feed name to which records are stored and published, such as in KAFKA.

Software developers monitor different aspects of software they develop by instrumenting the software. These aspects include performance of the software, disk utilization of the software, CPU utilization of the software, errors encountered during execution of the software, significant events encountered during execution of the software, information describing which parts of the code are being executed and which parts are not being executed, and so on. After development, similar aspects of the software are also monitored during production, for example, when software is being executed on a cloud architecture.

Conventional user environments are complicated because they include many micro transactions that are handled by a variety of hosts, containers, and infrastructure platforms. As a result, it is difficult to identify a root cause of an alert for a network problem, bad process, poor service, etc.

Computing operations can be described by spans and traces. A span may include an atomic computing operation performed in handling a request, and may include an operation name (e.g., "start"), a service (e.g., "analytics"), and start and end timestamps. Spans may be annotated with additional tags, such as key:value pairs, that provide further context regarding the execution environment. For example, a trace may include a set of spans traversed in the handing of a single request.

According to embodiments, each span and trace may have a duration equal to the difference between the start and end timestamps for the span, or for the group of spans forming the trace. Instrumented software may be instrumented to emit spans and traces. The spans and traces can be generated according to an industry standard, such as the OpenTracing standard. Each span may be annotated with one or more tags that provide context about the execution, such as the user instrumenting the software, a document involved in the request, an infrastructure element used in servicing a request, etc.

Communicating all of the spans and traces produced by a software application to an analysis system and storing these spans and traces imposes a serious infrastructure cost. Furthermore, it is unnecessary to transfer and store all emitted spans and traces, since code usually executes quickly and without errors. In prior implementations, traces emitted by a software application were randomly sampled and transmitted for analysis. However, certain types of traces provide more valuable information, and random sampling may not surface these traces. For example, if most traces are error-free, and only a few indicate errors, a random sampling scheme provides a large amount of uninteresting, error-free traces, and may miss the traces that indicate errors.

To obtain a sample of traces that includes a higher proportion of interesting traces, a gateway performs tail-based sampling of traces. The gateway resides at the instrumented software, receives all emitted spans and traces, and in real or near-real time, selects traces to transmit to an analysis system. For example, the gateway selects a portion of traces that include an interesting span (e.g., selecting for spans with long durations), a portion of traces that include a span with an error, and a portion of traces selected based on overall trace duration. The gateway may select spans and traces using a statistical model that references a reservoir of spans and traces. The gateway maintains in the reservoir a collection of duration values that describe the distributions of durations for recently received traces and recently received spans, and the span or trace distribution is used to calculate a score for each received span or trace. Each emitted trace has a chance of being selected, but the gateway favors selecting longer or unusual spans and traces. Each selected trace is associated with a weight indicating the likelihood that the trace is stored according to the statistical model.

The gateway may use a dynamic timeout mechanism to determine when a trace is complete. For example, the dynamic timeout mechanism may include both a fixed duration (e.g., 100 ms) and a variable duration that is calculated based on durations of other traces. If a trace reaches the larger of the fixed duration and the variable duration, it is considered complete and passed through the sampling mechanism in the gateway. The reservoir of recently received traces may be used to calculate the variable duration; for example, the variable duration may be five times the $99^{th}$ percentile duration for a trace or a curve based on duration. Both the fixed duration and the variable duration may be configurable. The dynamic timeout mechanism provides a balance between completeness/accuracy and timeliness. In addition, the dynamic timeout mechanism saves memory compared to using only a longer fixed duration, since in most cases, the sampling decision can be made sooner than if only a long fixed duration (e.g., 5 minutes) is used.

The analysis system receives the traces selected by the gateway and performs analysis on the selected traces. The analysis system may derive a distribution of all of the emitted spans and traces (not just the selected traces) based on the weights. The analysis system may receive traces, with their component spans and associated tags, from multiple instances of instrumented software.

In an embodiment, the analysis system compares durations of a set of similar spans (e.g., spans for the same type of request) with the tags associated with these spans and determines whether there are any patterns for a given tag. The analysis system generates a histogram that represents a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-values less than or equal to some threshold, e.g., 0.01.

In another embodiment, the analysis system uncovers patterns relating span tags to error spans, which are spans that cause an error or exception to be thrown. This can highlight possible explanations for errors and help users understand patterns among errors. For example, the analysis system can determine if error spans tend to come from a particular user (whose requests might be somehow malformed). To analyze errors, the analysis system computes, for each tag, the chi-squared statistic for the null hypothesis that the presence of the tag is statistically independent of whether the span is an error. The statistic will be larger (and the associated p-value smaller) when the tag is significantly more common among error spans than it is among non-error spans. The analysis system may correct the p-value for the number of hypotheses tested, for example, by multiplying the p-value by the total number of tags. This procedure defines a map from tags to non-negative real numbers. The analysis system sorts the tags by the associated p-value (in ascending order) and returns those with p-values less than or equal to some threshold, e.g., 0.01.

Architecture of a Metadata System in a Metrics Engine

FIG. 1 shows the overall system environment for reporting based on instrumented software, according to an embodiment. The overall system environment includes an instrumentation analysis system 100, one or more client devices 120, an administration system 160, and a reporting system 150. In other embodiments, more or less components than those indicated in FIG. 1 may be used. For example, client devices 120, administration system 160, and reporting system 150 may interact with instrumentation analysis system 100 via a network (not shown in FIG. 1). Furthermore, there may be more or less instances of each system shown in FIG. 1; for example, there may be multiple reporting systems 150.

FIG. 1 and the other figures use like reference numerals to identify like elements. A letter after a reference numeral, such as "130*a*," indicates that the text refers specifically to the element having that particular reference numeral. A reference numeral in the text without a following letter, such as "130," refers to any or all of the elements in the figures bearing that reference numeral (e.g., "130" in the text refers to reference numerals "130*a*" and/or "130*b*" in the figures).

The instrumentation analysis system 100 receives data comprising values of metrics sent by different client devices 120 (e.g., the instrumentation analysis system 100 may also be referred to herein as an analysis system or a data analysis system). A client device 120 executes instrumented software, for example, application 130. Although, application 130 is shown in FIG. 1 as an example of instrumented software, the techniques disclosed herein are not limited to application software but are applicable to other kinds of software, for example, server software, software executing on customer devices, websites, and so on. Furthermore, a client device 120 may include any computing system that is configured to execute instrumented software, whether or not it is used for development of improved software. For example, the client device 120 may be a computing system used for testing purposes, staging purposes, or any production system executing in an enterprise.

The software executing on a client device 120 is configured to send information generated as a result of instrumenting the software to instrumentation analysis system 100. For example, the application 130 may send values corresponding to various metrics as they are generated to instrumentation analysis system 100. The application 130 may send group values of metrics and send them periodically to instrumentation analysis system 100. Different applications 130 may send the same metric or different metrics at different rates. The same application may send different metrics at different rates. In an implementation, the application 130 may send data to the instrumentation analysis system 100 by invoking an application programming interface (API) supported by the instrumentation analysis system 100.

A gauge comprises instructions to measure certain runtime characteristics of the application 130, for example, heap size, number of cache misses or hits, active memory used, central processing unit (CPU) utilization, total time taken to respond to a request, time taken to connect to a service, and so on. A gauge may also be used to track certain application-specific parameters or business related values, for example, number of transactions, number of users, and so on. The gauge may be invoked periodically based on an interval that is configurable. The value of the gauge is sent to instrumentation analysis system 100 periodically.

A software program may be instrumented to generate spans with a common field in their data structures to designate spans that are part of a common trace. For example, the spans may include a trace identifier such that spans with the same trace identifier are a part of the same trace. A length of each trace may be determined by an administrator through the administration system 160.

The administration system 160 allows a privileged user, for example, a system administrator, to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify the application 130.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of the application 130.

Furthermore, the instrumentation analysis system 100 provides separation of the metadata describing the data streams from the data of the data streams. Accordingly, the amount of data that needs to be transmitted from the client devices 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be configured to generate a histogram to analyze generated spans and traces. In an implementation, the reporting system 150 may include a histogram generator 140 that interacts with the instrumentation analysis system 100 to generate a histogram.

The reporting system 150 can be a conventional computer system (e.g., a desktop or laptop computer), a tablet, or a device having computer functionality such as a personal digital assistant (PDA), a mobile telephone, a smart phone, or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage, and input/output controller. The computing system used for hosting the instrumentation analysis system 100 is typically a server-class system that uses powerful processors, large memory, and fast input/ output systems compared to a typical computing system used, for example, as a reporting system 150.

In an embodiment, data from several client devices 120 may be consolidated, for example, by a server and the combined data sent to the instrumentation analysis system 100. For example, an enterprise may install a server that receives data streams internally from different client devices 120 and sends the combined data in a batch form to the instrumentation analysis system 100 periodically. This allows efficiency of external communication from the enterprise.

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are CPU load, cache misses, cache hits, and so on. A value of a dimension is also referred to as a coordinate value of the data stream. A coordinate value may be represented as a metadata attribute stored in a metadata store. Given the two dimensions of source and metric, a data stream may be identified by providing the two coordinates representing the source and the metric, for example, (server1, cpu_load) or (server2, memory_usage).

A data stream may be characterized by multiple dimensions more than the two dimensions (i.e., source and metric name) described above. For example, if each server has multiple CPUs, a dimension cpu_id may be included. Accordingly, each data stream obtained from a system may be characterized by (source_id, cpu_id, metric_name), i.e., a source identifier, a CPU identifier, and a name for the metric. Examples of data streams identified using three coordinates include (server1, cpu1, load), (server1, cpu2, load), (server2, cpu1, load), (server2, cpu2, load), and so on. According to embodiments, each data stream may include spans and traces.

As another example of a dimension, a system may define customer name as a dimension. The name of the customer may be reported by the instrumented software, for example, based on the configuration parameters of the instrumented software executing on a client device 120. The customer name may be specified for the instrumented software using a system property. The instrumented software includes the customer name when it identifies a data stream associated with that particular customer. The ability to associate a data stream with a customer allows the instrumentation analysis system to perform customer-specific analysis, for example, report on usages of systems for each customer, identify customers reporting more than a threshold number of errors, and so on.

A data stream may be obtained from instrumented software or may be generated as a result of execution of blocks of a data stream language program within the instrumentation analysis system 100. A data stream may also comprise data stored in the instrumentation analysis system 100, for example, in a data store, such as a time series data store 260, described herein.

Figure 2:
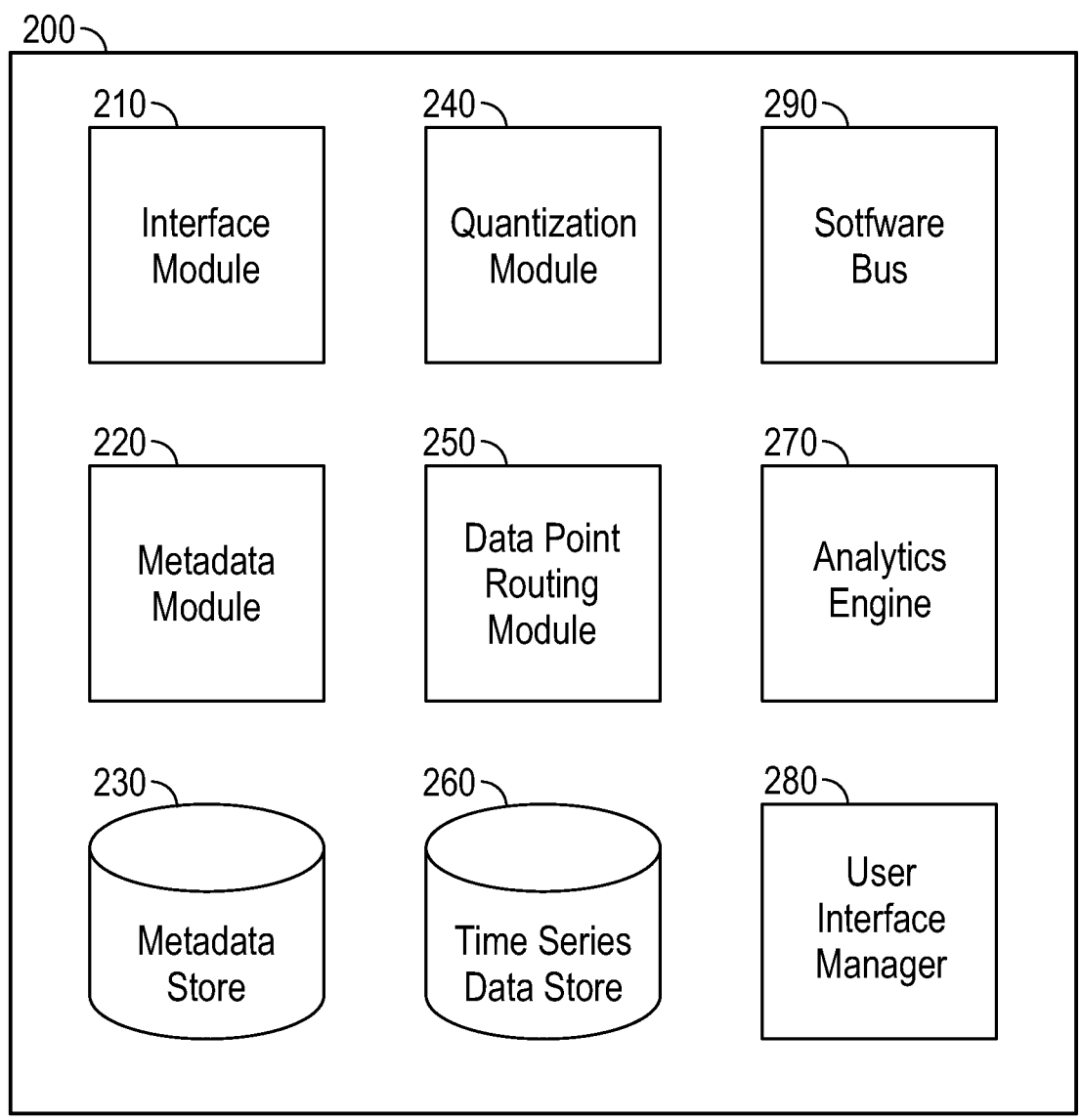
FIG. 2 shows an architecture of a system for processing data streams received from instrumented software, according to an embodiment of the present disclosure.

FIG. 2 shows an architecture of a system for processing data streams received from instrumented software, according to an embodiment. The instrumentation analysis system 200 includes an interface module 210, a quantization module 240, metadata module 220, metadata store 230, a data point routing module 250, an analytics engine 270, a user interface manager 280, a time series data store 260, and a software bus 290. In other embodiments, the instrumentation analysis system 200 may include other modules not described herein. Functionality indicated as provided by a particular module may be implemented by other modules instead.

The interface module 210 receives requests from external systems, for example, client devices 120 that communicate with the instrumentation analysis system 200. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams comprising spans and traces from one or more client devices 120. In an embodiment, the interface module 210 receives data and represents the incoming data as tuples. Accordingly, each data stream is represented as a plurality of tuples, each tuple representing a data point. A tuple of data received by the interface module 210 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 130 sending the data, and one or more properties associated with the data.

In an embodiment, the timestamp associated with a tuple represents the time that the data value was received by the instrumentation analysis system 200. The properties associated with the data may be provided in the form of name-value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 200.

The metadata module 220 receives and stores metadata information describing various data streams received from the client devices 120. In an embodiment, the metadata stored in the metadata module 220 is received from a user, for example, a system administrator interacting with the instrumentation analysis system 200 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata store 230 stores the metadata objects and their associations with the data streams. The metadata store 230 stores an identifier (ID) for each metadata object and the properties represented by the metadata object. In an embodiment, each data stream is associated with a time series identifier that uniquely identifies the data stream. The metadata store 230 stores an index that maps each metadata object to a set of time series identifier values. The metadata store 230 may receive instructions to modify a metadata object. For example, the metadata store 230 may receive instructions to modify, add, or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The time series data store 260 stores data received from various sources, for example, client devices 120. The time series data store 260 is also referred to herein as a time series database (or TSDB). In an embodiment, the time series data store 260 also stores the time series data after the data is quantized. The time series data store 260 may also store rollup data for each time series. The time series data store 260 also stores results of various analytics requests, for example, results of various reports requested by a user. The analytics engine 270 computes results for certain reports, for example, moving averages over intervals of time by combining data stored in the time series data store 260 with new data obtained as data stream from various sources.

The software bus 290 provides a mechanism for modules of the instrumentation analysis system 200 to provide data of data streams to other modules of the instrumentation analysis system 200. A data stream language program may send a data stream to the software bus 290. Other modules, for example, fetch modules, window modules, and so on, can read the data from the software bus 290 and perform further processing on the data. For example, a data stream output of a data stream language program published on the software bus 290 may be identified by a find block of another data stream language program executing as a job.

Architecture for Processing Input Data

Figure 3:
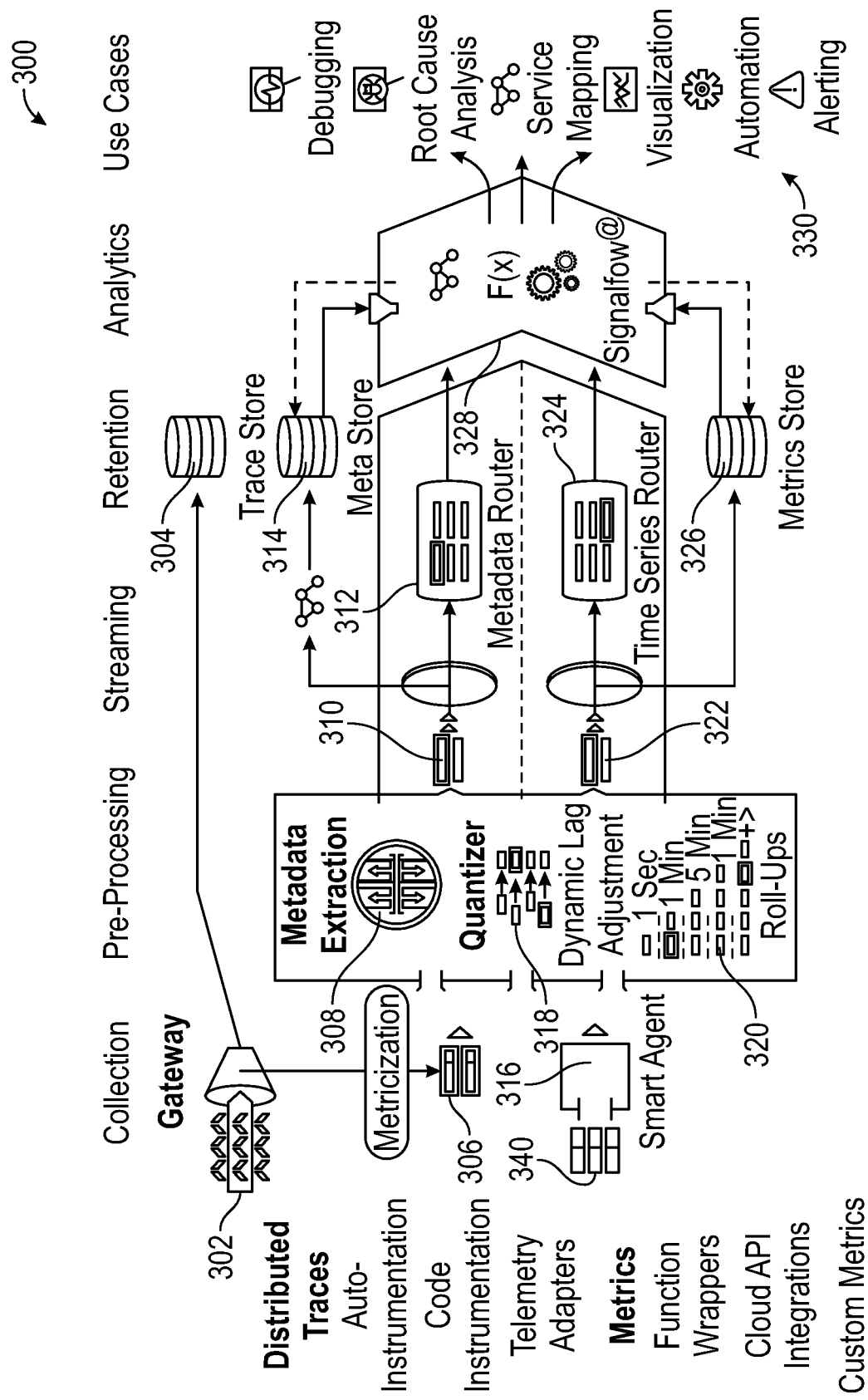
FIG. 3 shows an overall system architecture for processing input data, according to an embodiment of the present disclosure.

FIG. 3 shows an overall system architecture 300 for processing input data, according to an embodiment of the present disclosure. The architecture 300 may be configured to receive an input data stream 302. The input data stream 302 may include tail-sampled traces that are stored in a trace database 304. The input data stream 302 may also be metricized to generate metricized data 306. Metadata 310 may be extracted from the metricized data 306 through a metadata extractor 308.

According to embodiments, input data 340 may be processed by a smart agent 316 and quantized into metrics 322 to adjust for lag 318 based on roll-up periods 320. For example, the input data 340 may be received from cloud services (e.g., AMAZON WEB SERVICES, AZURE, GOOGLE CLOUD, etc.), open source software, language libraries (e.g., JAVA, PYTHON, GOLANG, etc.), operating systems, etc. In an implementation, the input data 340 may be processed based on a series of time windows (e.g., 1 sec, 1 min, 5 min, 1 hour, etc.). Multiple roll-ups including sum, count, min, max, lag, etc. may also be calculated.

According to embodiments, the metadata 310 may be processed separately from the metrics 322. For example, the metadata 310 may be stored in a metadata database 314 and also processed through a metadata router 312. The metrics 322 may be stored in a metric database 326 and processed through a time series router 324. The metadata 310 and metrics 322 may further be processed through a signal flow 328 as inputs to data science processes 330. For example, the data science processes 330 may include automatic outlier analysis, trace analysis, and incident analysis, among others.

Figures 4, 5:
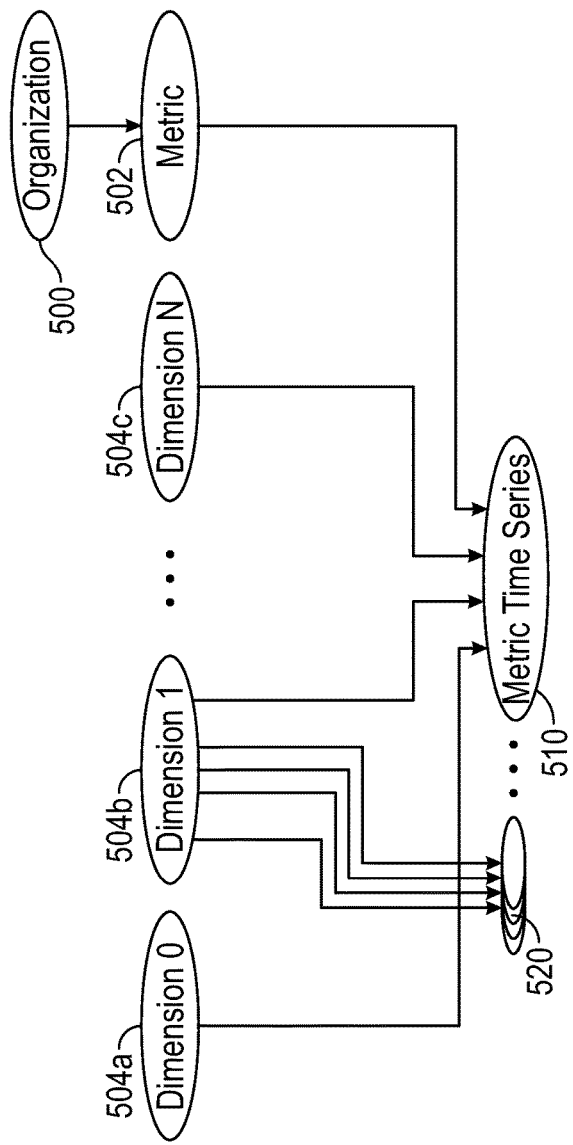
FIG. 4 shows an example data structure, according to an embodiment of the present disclosure.
FIG. 5 shows an example of a conventional metric time series (MTS) object, according to an embodiment of the present disclosure.

FIG. 4 shows an example data structure 400, according to an embodiment of the present disclosure. For example, the data structure 400 may include a timestamp 402, a value 404, and a metric time series (MTS) object 420. The MTS object 420 may include multiple dimensions (e.g., metadata objects), such as a metric 406, a customer 408, a service 410, and a host 412. In implementations, the metric 406 may be a special case of a dimension. It is understood that an MTS object 420 may include at least one dimension, and as many as over 30 dimensions.

According to embodiments, the MTS object 420 may be identified by a unique combination of dimensions. For example, the illustrated MTS object 420 has four dimensions—one dimension each for a metric 406, a customer 408, a service 410, and a host 412. If dimensions were added, removed, or changed, the MTS object 420 would be recognized as a different MTS object from before.

According to embodiments, names and values may be extracted from the metadata. For example, the names may include tags such as "customer," "service," "host," etc. The values may include corresponding properties of the tags (e.g., keys), such as "num_transactions," "customer_name," "service_name," "host_name," etc. The names may be linked with the values as name-value pairs, such that each dimension of an MTS object includes a name-value pair. For example, as illustrated in FIG. 4, "Customer-Acme," "Metric-Num_Transactions," "Service-Checkout," and "Host-host9" may be name-value pairs for each dimension of the MTS object 420. In this way, each MTS object 420 can point to multiple dimensions.

FIG. 5 shows an example of a conventional metric time series (MTS) object 510. As illustrated, the MTS object 510 is de-normalized, which means that the MTS object 510 inherits all of the properties of dimensions 504a, 504b, 504c, metric 502, and organization 500. For example, the dimensions 504 may be for host, cluster, service, etc. The metric 502 is a special dimension with a fixed, well-known name. Each dimension 504 may have an immutable name and value, and a unique name-value combination (e.g., in the namespace of the tenant). Each dimension 504 may also optionally store additional mutable properties.

Conventionally, any change(s) to any of the properties of dimensions 504a, 504b, 504c, metric 502, and/or organization 500 would be copied down to the MTS object 510. Conventionally, the dimensions 504a, 504b, and 504c may also be linked to millions of other MTS objects 520. As a result, any change(s) to any of the properties of any of dimensions 504a, 504b, 504c, metric 502, and/or organization 500 would also be copied down to the millions of other MTS objects 520 as well. This is problematic because it is resource intensive and causes undesirable delays to the architecture 300.

Virtual Partitioning of Data

Cloud computing provides users access to on-demand computer system resources, such as data storage and computing power, without direct active management by the users. It is a powerful tool that has allowed software providers to efficiently and effectively distribute software services to end users. Software as a service (SaaS) is an example of cloud computing where a software provider's applications are accessible to users as on-demand software through a web browser or a program interface. The on-demand software may be deployed in a multi-tenant environment where multiple customers may access the same instance of the on-demand software. Accordingly, there is a need for partitioning of customer data in a multi-tenant environment.

Conventionally, every customer (e.g., tenant) in a multi-tenant environment had their own topic that was sharded (e.g., partitioned). As a result, on-boarding of new customers required manual provisioning and sharding of a new topic based on each customer, which is inefficient and not scalable. This additionally reduces the efficiency of utilizing computer resources, because each topic and downstream consumer incurs extra fixed costs. A simple alternative could be to partition all data from all customers across all partitions on a single topic. However, that solution has scalability issues as well, because it forces all consumer processes across a topic to process data from all customers, which harms data locality and continuity.

Embodiments of the present disclosure provide for systems and methods for virtual partitioning of a shared message bus. The virtual partitioning allows for the data of a particular customer to be limited to a particular subset (i.e., not necessarily just one) of the partitions (e.g., physical partitions) of a shared topic. Additionally, data from all customers may be reasonability evenly distributed across all KAFKA partitions. This allows for having multiple customers on a single topic until the topic reaches a maximum capacity. In cases of customers with special requirements, they may have their own topic(s), based on the customers' needs.

Advantages include auto-provisioning of smaller customers and/or trials. For example, small tenants and/or trials may be automatically configured to be on a specific default shared, multi-tenant topic. It also allows for segregating that topic into a particular KAFKA cluster. Additional advantages include increased efficiency of computing and memory resources. Another advantage is that this solution improves data locality where a customer's data are limited to a subset of consumers. Data locality is important for a system that handles a large amount of data because they can be better compressed and queried faster. A further advantage is, with all the advantages mentioned above, providers are still able to reasonably and evenly distribute all customers' data across all KAFKA partitions. The even distribution further simplifies the management of a homogenous set of consumer processes.

The disclosed system addresses a problem in traditional data partitioning tied to computer technology, namely, the technical problem of partitioning data. The disclosed system solves this technical problem by providing a solution also rooted in computer technology, namely, by providing for virtual partitioning of a shared message bus. The disclosed subject technology further provides improvements to the functioning of the computer itself because it improves efficiency in processing the data and reduces utilization of computing and memory resources.

Figure 6:
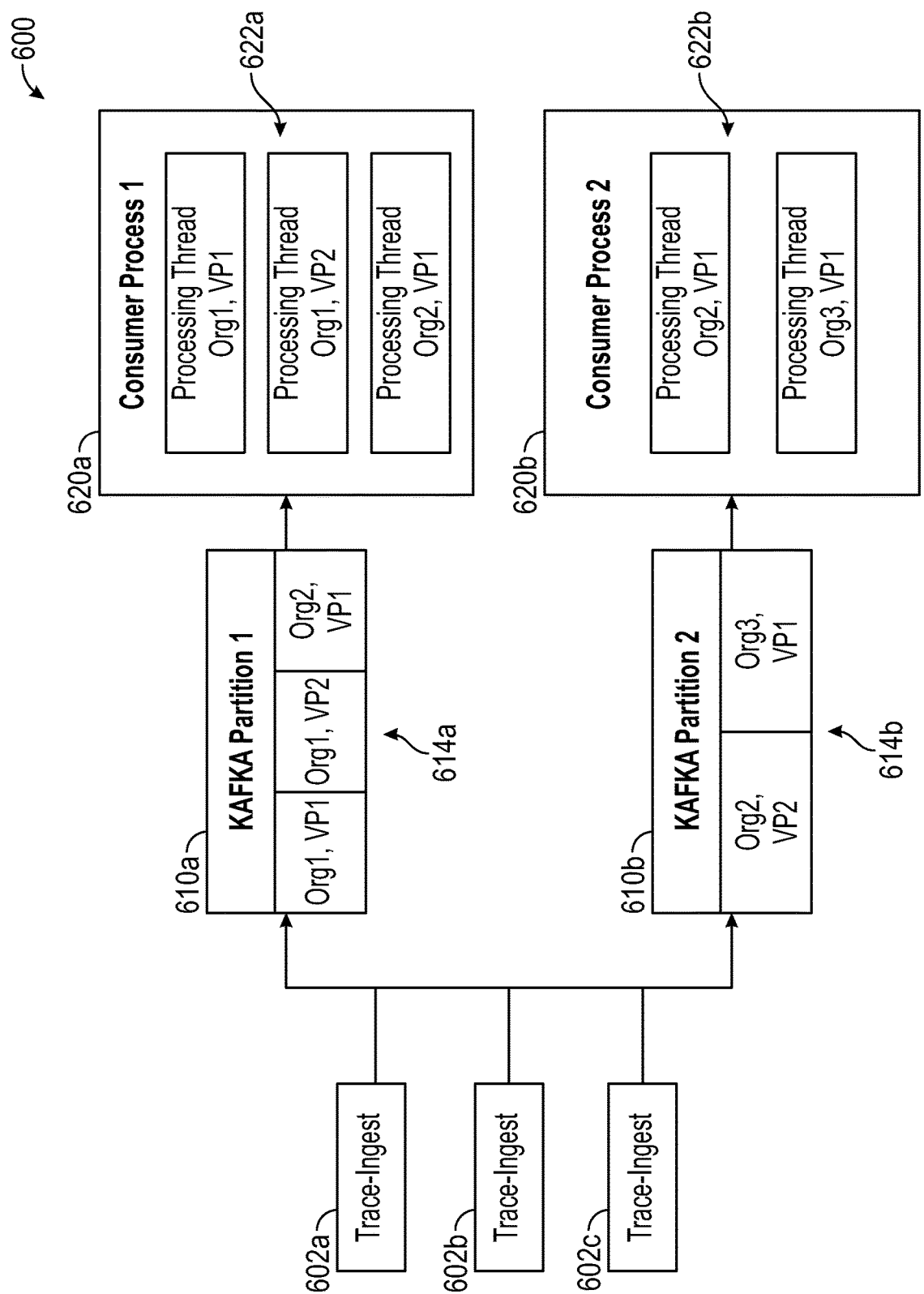
FIG. 6 illustrates an exemplary system architecture for virtual partitioning of data, according to an embodiment of the present disclosure.

FIG. 6 illustrates an exemplary system architecture 600 for virtual partitioning of data, according to an embodiment of the present disclosure. The system 600 may include multiple trace-ingests 602a, 602b, 602c for virtually partitioning data of users. For example, a stream of data may be received that includes traces (e.g., trace data) for various users (e.g., customers/tenants/organizations) in a multi-tenant environment. The stream of data may be provided by a firehose (e.g., a KAFKA firehose) or by direct remote invocations (e.g., HTTP requests). The traces may be assigned to multiple virtual partitions 614a, 614b by the trace-ingests 602a, 602b, 602c based on each user. For example, a first set of virtual partitions 614a may include trace data for a first user (e.g., Org1) and a second user (e.g., Org2), and a second set of virtual partitions 614b may include trace data for the second user and a third user (e.g., Org3). It is understood that the virtual partitions are exemplary only, and there may be more or less virtual partitions based on trace data for each user. It is further understood that each user may have one or more virtual partitions based on the trace data.

According to aspects, the trace-ingests 602a, 602b, 602c may publish virtual partitions that are scheduled on to KAFKA partitions 610a, 610b (e.g., shared KAFKA partitions). As illustrated, the scheduled-on virtual partitions 614a, 614b have been published to the shared KAFKA partitions 610a, 610b with a same topic by the trace-ingests 602a, 602b, 602c. As illustrated, a first KAFKA partition 610a may include the first set of virtual partitions 614a, and a second KAFKA partition 610b may include the second set of virtual partitions 614b. According to aspects, the traces may be assigned to multiple virtual partitions 614a, 614b by the trace-ingests 602a, 602b, 602c based on each user. For example, the first set of virtual partitions 614a may include trace data for a first user (e.g., Org1) and a second user (e.g., Org2), and the second set of virtual partitions 614b may include trace data for the second user (e.g., Org2) and a third user (e.g., Org3). Furthermore, the first set of virtual partitions 614a may include virtual partitions (Org1, VP1), (Org1, VP2), and (Org2, VP1), and the second set of virtual partitions 614b may include virtual partitions (Org2, VP2) and (Org3, VP1). As illustrated, Org1 may have two virtual partitions (e.g., (Org1, VP1), (Org1, VP2)), both of which may be included in the first KAFKA partition 610a. Org2 may also have two virtual partitions, with its first virtual partition (e.g., (Org2, VP1)) included in the first KAFKA partition 610a, and its second virtual partition (e.g., (Org2, VP2)) included in the second KAFKA partition 610b. Org3 may have one virtual partition (e.g., (Org3, VP1)), which may be included in the second KAFKA partition 610b. It is understood that the KAFKA partitions are exemplary only, and there may be more or less KAFKA partitions based on the virtual partitions. It is further understood that more or less users may be included in the shared topic based on the trace data of each virtual partition.

According to aspects, consumer processes 620a, 620b may be created for each KAFKA partition 610a, 610b. For example, a first consumer process 620a may be configured to consume the first set of virtual partitions 614a, and a second consumer process 620b may be configured to consume the second set of virtual partitions 614b. The first consumer process 620a may include first consumer threads 622a, each of which may process data for a specific virtual partition of the first set of virtual partitions 614a. For example, a first thread of the first consumer threads 622a may consume a first virtual partition (e.g., (Org1, VP1)) of the first set of virtual partitions 614a, a second thread of the first consumer threads 622a may consume a second virtual partition (e.g., (Org1, VP2)) of the first set of virtual partitions 614a, and a third thread of the first consumer threads 622a may consume a third virtual partition (e.g., (Org2, VP1)) of the first set of virtual partitions 614a. Similarly, the second consumer process 620b may include second consumer threads 622b, each of which may process data for a specific virtual partition of the second set of virtual partitions 614b. For example, a first thread of the second consumer threads 622b may consume a first virtual partition (e.g., (Org2, VP2)) of the second set of virtual partitions 614b, a second thread of the second consumer threads 622b may consume a second virtual partition (e.g., (Org3, VP1)) of the second set of virtual partitions 614b. In an implementation, a load of the traces may be across multiple consumers. It is understood that these consumer processes are exemplary only, and there may be more or less consumer processes based on a number of KAFKA partitions.

According to aspects, assignment by the trace-ingests 602 of trace data to the virtual partitions 610 may be accomplished by the following:

v_id=consistent_hash(hash(trace_id), number of virtual partitions per user)　　　(Eq. 1)

For example, Equation (1) maintains a stable traces-to-virtual partitions assignment. Therefore, when adding virtual partitions, only 1/N traces need to be moved around, where N is the number of existing virtual partitions.

According to aspects, scheduling virtual partitions to KAFKA partitions may be based on a weighted stable load balancing algorithm.

According to aspects, each KAFKA partition may be designated with a maximum capacity. For example, the maximum capacity may be based on a maximum throughput (e.g., both trace load and cardinalities for each user) that a single consumer can handle.

According to aspects, there may be a cap to how many virtual partitions 610 a user may be assigned. For example, a maximum number of virtual partitions for each user may be determined by:

number of virtual partitions=ceil(total trace load/load capacity per virtual partition)　　　(Eq. 2)

According to aspects, virtual partition resource requirements may be determined by:

user total trace load=trace load per virtual partition*number of virtual partitions　　　(Eq. 3)

user total cardinality=cardinality per virtual partition　　　(Eq. 4)

Each user will have different requirements per virtual partition based on different load signatures.

According to aspects, virtual partitions for each user may be assigned to a least loaded KAFKA partition by trace load, cardinality, and then a KAFKA partition identifier (e.g., partition identifier) without exceeding the total limit. For example, the trace load may be compared first. The cardinality may be utilized as a tie-breaker. The partition identifier may be utilized for ordering and for keeping a consistent and stable assignment. For example, Table 1 below illustrates a case where there are four KAFKA partitions numbered K1 to K4 with capacity (load: 4, cardinality: 4) respectively. According to an aspect, two users (e.g., orgs) with the following signatures may be on-boarded:

TABLE 1

| User Name | Trace Load | Cardinality | # v-partitions |
|---|---|---|---|
| Ro | 2 | 1 | 4 |
| Sh | 1 | 2 | 2 |

According to aspects, after assigning Ro, the schedule will be:

K1→Ro1 K2→>Ro2 K3→>Ro3 K4→>Ro4 (Sch. 1)

where the above special representation is based on <Physical Partition>→<Org/Tenant><Virtual Partition>. For example, in Sch. 1 above, for the first item, K1 is the physical partition, Ro is the org/tenant, and 1 is the virtual partition.

After assigning Sh, the schedule will be:

K1→Ro1,Sh1 K2→Ro2, Sh2 K3→Ro3 K4→Ro4 (Sch. 2)

According to aspects, scaling (e.g., re-partitioning) may be accomplished by adding new virtual partitions. New partitions are added based on the same assignment strategy. It will not affect the existing virtual partitions assignment. For example, after adding two more Ro virtual partitions, the schedule will be:

K1→Ro1,Sh1 K2→Ro2, Sh2 K3→Ro3,Ro5 K4→Ro4, Ro6 (Sch. 3)

According to aspects, adding a new KAFKA partition may not immediately trigger any repartitioning based on the scheduling algorithm above. An explicit scheduling command (as described in more detail below) may reschedule a user in order to minimize trace reshuffling. For example, after adding two more KAFKA partitions after Sch. 3 and triggering a reassignment for User Sh, the schedule will be:

K1→Ro1 K2→Ro2 K3→Ro3, Ro5 K4 →Ro4,Ro6 K5→Sh1 K6→Sh2 (Sch. 4)

According to aspects, increasing the cardinality and trace load requirements may trigger a complete re-assignment. For example, assuming that Sch. 2 has been set, in order to increase User Sh's cardinality from 2 to 4, assigned partitions ordered by trace loads may be evicted for those KAFKA partitions and reassignment are triggered on them:

K1→Sh1 K2→Sh2 K3→Ro1, Ro3 K4→Ro2, Ro4 (Sch. 5)

According to additional aspects, users may be mapped to different topics for reasons like compliance, security, giant customers, different instance types, etc. In an implementation, KAFKA topic assignments per user may be mapped to a cluster of KAFKA topics.

As discussed above, scheduling (e.g., to centralized schedule storage) may include storing the schedule and cluster information to a database (e.g., ZOOKEEPER). According to aspects, an object layout may be as follows:

{
　"topics": {
　　"1": {# any string that adheres to the KAFKA topic
　　　naming convention
　　　"partitions": 10,
　　　"totalMBPerPartition": 20, # MB/s
　　　"maxCardPerPartition": 30,
　　　"maxMBPerVPartition": 4, # MB/s
　　　"cluster":"nexus" # possibly another cluster
　　}

```
},
"schedules": {
  "<org_id>": {
    "vPartitions": 10,
    "cardinality": 20,
    "traceLoadMB": 30, # MB/s
    "topicIndex": "1",
    "schedule": [1, 5, 7, 8], # index=v-partition,
        value=kafka-partition
  }
}
}
```

According to aspects, the system 600 may be configured to apply to different workload types. For example, a first workload type may be for a large trace load and a large cardinality. The first workload type may be suited for standalone consumers. A second workload type may include a large trace load and a small cardinality. The second workload type may be spread to multiple consumers for improved processing latency. A third workload type may include a small trace load and a large cardinality. The third workload type may be co-located with the second workload type with less consumers. A fourth workload type may include a small trace load and a small cardinality. The fourth workload typed may be packed together with the second workload type and the third workload type.

In an implementation, the trace-ingests 602 may first dump their data into a KAFKA feed (e.g., a super-wide KAFKA feed), and then a set of consumers downstream from the KAFKA feed may perform partitioning and reshuffling based on the scheduling strategy discussed above. This would provide operational resiliency/options when it comes to resharding/updating the code.

According to additional aspects, a user may publish to multiple topics. For example, if a user is migrating from a multi-tenant topic to their own topic, or vice versa, the user may publish to both the multi-tenant topic and their own topic to effectuate the transition. Once the user has completed migration to either the multi-tenant topic or their own topic, then publication may cease to the other topic not migrated to. For example, if the user is migrating from a multi-tenant topic to their own topic, then once the transition is complete, the user stops publishing to the multi-tenant topic while continuing to publish to their own topic. Conversely, if the user is migrating from their own topic to a multi-tenant topic, then once the transition is complete, the user stops publishing to their own topic while continuing to publish to the multi-tenant topic.

According to aspects, an exemplary data model for migrating a user may be as follows:

```
{
"topics": {
  "ABC": { # user's own topic
    "partitions": 10,
    "totalMBPerPartition": 20, # MB/s
    "maxCardPerPartition": 30,
    "maxMBPerVPartition": 4, # MB/s
    "cluster":"apm-firehose" # possibly another cluster
  },
  "XYZ": { # multi-tenant topic
    "partitions": 1024,
    "totalMBPerPartition": 20, # MB/s
    "maxCardPerPartition": 30,
    "maxMBPerVPartition": 4, # MB/s
    "cluster":"apm-firehose-multi-tenant" # possibly
        same cluster
  }
},
"orgs": {
  "<ABC>": {
    "cardinality": 20,
    "traceLoadMB": 30, # MB/s
    "publishers": ["ABC", "XYZ-ABC"]
  }
}
"pubs": {
  "ABC": {
    "vPartitions": 4,
    "topicIndex": " ABC",
    "schedule": [1, 5, 7, 8], # index=v-partition,
        value=kafka-partition
  },
  "XYZ-ABC": {
    "vPartitions": 4,
    "topicIndex": " XYZ",
    "schedule": [11, 15, 17, 18], # index=v-partition,
        value=kafka-partition
  }
}
}
```

Figure 7:
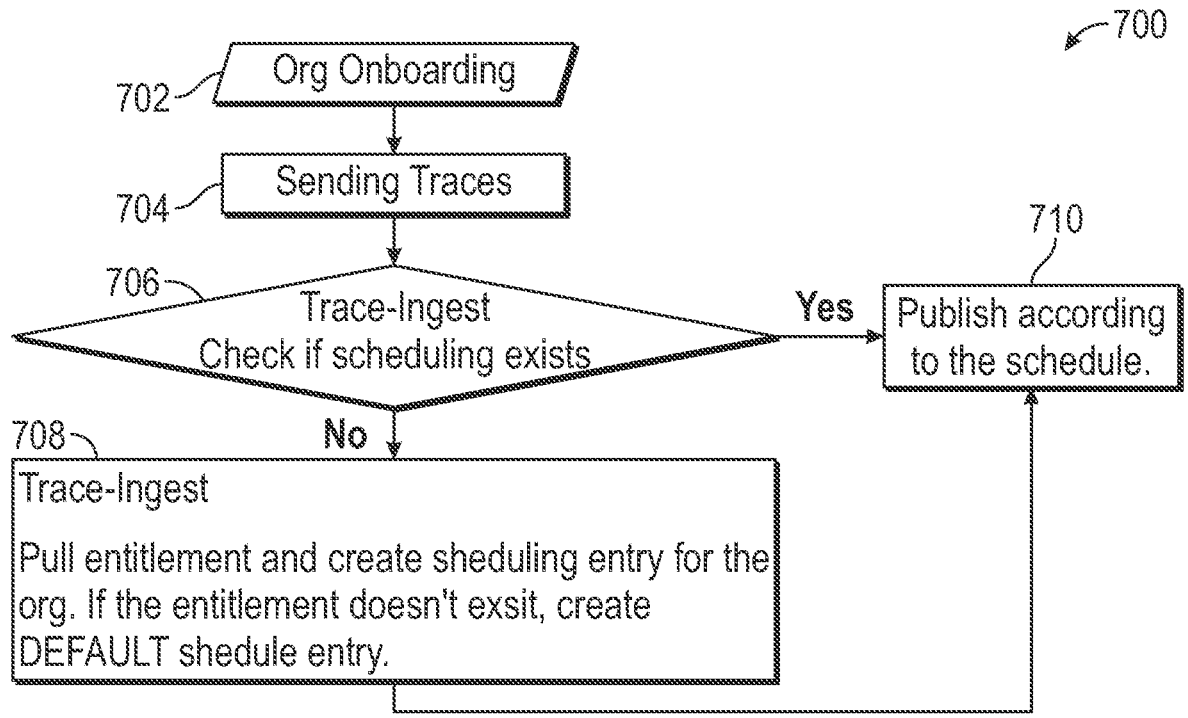
FIG. 7 illustrates an exemplary process flow for virtual partitioning of data, according to an embodiment of the present disclosure.

FIG. 7 illustrates an exemplary process flow 700 for virtual partitioning of data, according to an embodiment of the present disclosure. The process may begin at step 702 with on-boarding of a user. At step 704, traces are sent. At step 706, it is determined whether a trace-ingest schedule exists. If no, then at step 708 trace-ingest pulls entitlement and creates a scheduling entry for the user (e.g., org), which is published according to the schedule at step 710. If yes, then the process 700 may proceed directly to step 710. According to aspects, there may be multiple trace-ingest hosts receiving traces.

In an implementation, a firehose message change may include two additional headers to messages sent by trace-ingest: 0×01—orgId, and 0×02—vPartitionId, where orgId includes a unique identifier of a customer (e.g., tenant) in the company. These two headers may be utilized by KAFKA consumers (e.g., in processors and ingesters) to dispatch a message bundle to a corresponding processing thread. This is because the native KAFKA consumer utilizes a single thread doing polling, decompression, and deserialization per partition. According to aspects, deserialization may be delegated to one level below (e.g., a processing thread) for improved parallelization.

According to aspects, each KAFKA ConsumerRecord may contain exactly one span. For example, multiple ConsumerRecords may be bundled into batches for compression.

Process for Virtual Partitioning of Data

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 8:
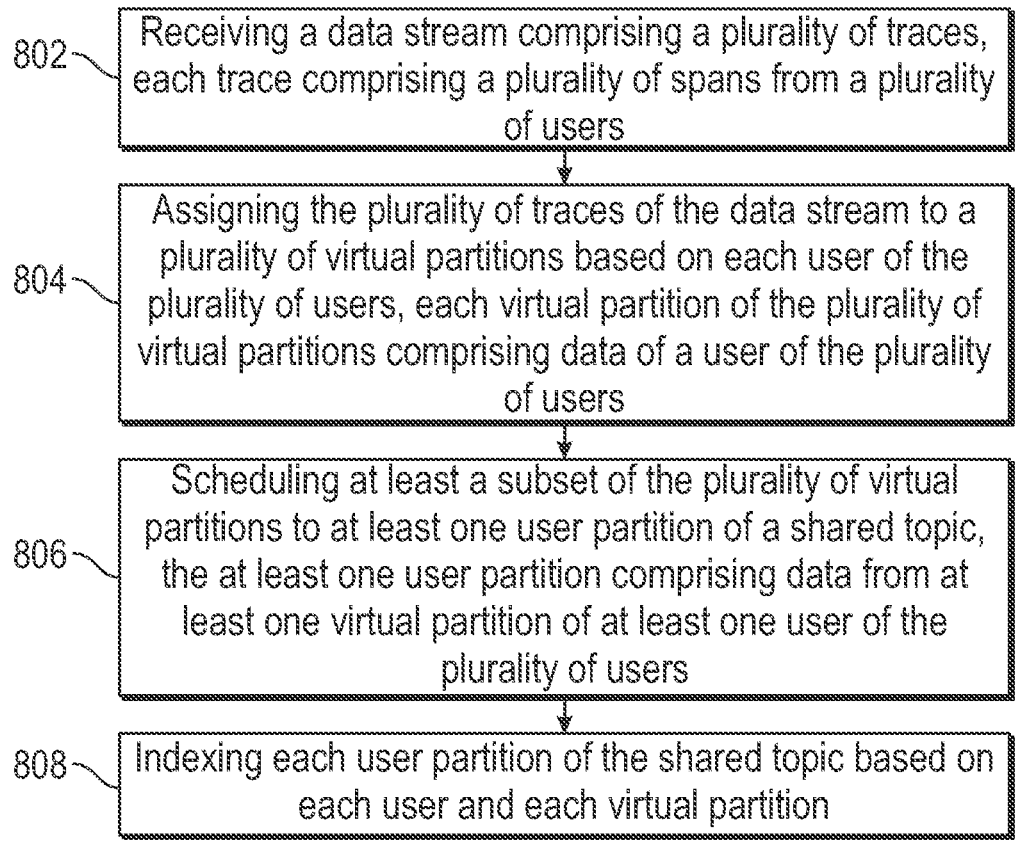
FIG. 8 is a flow diagram illustrative of an embodiment of a process for virtual partitioning of data, according to embodiments of the present disclosure.

FIG. 8 is a flow diagram illustrative of an embodiment of a process 800 for virtual partitioning of data, according to embodiments of the disclosure. For explanatory purposes, the example process 800 is described herein with reference to FIGS. 6 and 7. Further, for explanatory purposes, the steps of the example process 800 are described herein as occurring in serial, or linearly. However, multiple instances of the example process 800 may occur in parallel, and/or the various steps may be performed concurrently and/or in a different order or sequence than is described herein. For purposes of explanation of the subject technology, the process 800 will be discussed in reference to FIGS. 6 and 7.

At step 802, a data stream comprising a plurality of traces is received. For example, each trace may include a plurality of spans from a plurality of users. At step 804 the plurality of traces of the data stream are assigned to a plurality of virtual partitions based on each user of the plurality of users. Each virtual partition of the plurality of virtual partitions may include data of a user of the plurality of users. At step 806, at least a subset of the plurality of virtual partitions are scheduled to at least one user partition of a shared topic. For example, the at least one user partition may include data from at least one virtual partition of at least one user of the plurality of users. At step 808, each user partition of the shared topic is indexed based on each user and each virtual partition.

For example, as described above in relation to FIGS. 6 and 7, at step 802, a data stream comprising a plurality of traces is received at a trace-ingest (e.g., trace-ingests 602). For example, each trace may include a plurality of spans from a plurality of users during on-boarding of the users (e.g., steps 702 and 704 of FIG. 7). At step 804 the plurality of traces of the data stream are assigned to a plurality of virtual partitions (e.g., virtual partitions 610) based on each user of the plurality of users. Each virtual partition of the plurality of virtual partitions may include data of a user of the plurality of users. At step 806, at least a subset of the plurality of virtual partitions are scheduled (e.g., steps 706 and 708 of FIG. 7) to at least one user partition (e.g., user partition 612) of a shared topic (e.g., shared topic 614). For example, the at least one user partition may include data from at least one virtual partition of at least one user of the plurality of users. At step 808, each user partition of the shared topic is indexed (e.g., through consumer processes 620*a*, 620*b*) based on each user and each virtual partition.

According to embodiments, the user partitions comprise KAFKA partitions. According to embodiments, the shared topic comprises a KAFKA topic.

According to embodiments, the indexing may include processing each user partition through a consumer process. According to embodiments, scheduling the subset of the plurality of virtual partitions is based at least in part on a weighted stable load balancing algorithm.

According to embodiments, each user partition comprises a maximum capacity based on a maximum throughput of a consumer. According to embodiments, a number of virtual partitions for each user is based on a total trace load and a trace load capacity of each virtual partition.

According to embodiments, the process 800 further includes assigning each virtual partition to a least loaded user partition based on at least one of a trace load, a cardinality, and a partition identifier.

According to embodiments, the process 800 further includes storing schedules of the shared topic in a database. According to embodiments, the process 800 further includes adding a new virtual partition to a schedule of the shared topic.

According to embodiments, the process 800 further includes adding a new user partition to a schedule of the shared topic. According to embodiments, the process 800 further includes increasing at least one of a cardinality or a trace load of a schedule of the shared topic.

What is claimed is:

1. A computer-implemented method for virtual partitioning of data, the method comprising:
   receiving a data stream comprising a plurality of traces, each of the plurality of traces comprising a plurality of spans from a plurality of users;
   assigning the plurality of traces of the data stream to a plurality of virtual partitions based on each user of the plurality of users, each virtual partition of the plurality of virtual partitions comprising data of a user of the plurality of users;
   publishing the plurality of virtual partitions, wherein at least a subset of the plurality of virtual partitions are scheduled on to at least one user partition with a shared topic by the plurality of traces of the data stream, the at least one user partition comprising data from at least one virtual partition of at least one user of the plurality of users;
   configuring a plurality of consumer processes for each of the at least one user partition, each consumer process of the plurality of consumer processes including consumer threads processing data for virtual partitions of the subset of the plurality of virtual partitions; and
   consuming at least the subset of the plurality of virtual partitions based on the plurality of consumer processes.

2. The computer-implemented method of claim 1, further comprising:
   determining whether a schedule corresponding to the plurality of users exists; and
   based on a determination that the schedule does not exist for at least one of the plurality of users, creating a scheduling entry for the at least one user, wherein the plurality of virtual partitions are published according to the schedule.

3. The computer-implemented method of claim 1, wherein scheduling the subset of the plurality of virtual partitions is based at least in part on a weighted stable load balancing algorithm.

4. The computer-implemented method of claim 1, wherein each of the at least one user partition comprises a maximum capacity based on a maximum throughput of a consumer.

5. The computer-implemented method of claim 1, wherein a number of virtual partitions for each user is based on a total trace load and a trace load capacity of each of the plurality of virtual partitions.

6. The computer-implemented method of claim 1, further comprising:
   assigning each of the plurality of virtual partitions to a least loaded user partition based on at least one of a trace load, a cardinality, and a partition identifier.

7. The computer-implemented method of claim 1, further comprising:
   storing schedules of the shared topic in a database.

8. The computer-implemented method of claim 1, further comprising:
   adding a new virtual partition to a schedule of the shared topic.

9. The computer-implemented method of claim 1, further comprising:
   adding a new user partition to a schedule of the shared topic.

10. The computer-implemented method of claim 1, further comprising:
    increasing at least one of a cardinality or a trace load of a schedule of the shared topic.

11. A system for virtual partitioning of data, the system comprising:
- at least one memory having instructions stored thereon; and
- at least one processor configured to execute the instructions, wherein the at least one processor is configured to:
- receive a data stream comprising a plurality of traces, each of the plurality of traces comprising a plurality of spans from a plurality of users;
- assign the plurality of traces of the data stream to a plurality of virtual partitions based on each user of the plurality of users, each virtual partition of the plurality of virtual partitions comprising data of a user of the plurality of users;
- publish the plurality of virtual partitions, wherein at least a subset of the plurality of virtual partitions are scheduled on to at least one user partition with a shared topic by the plurality of traces of the data stream, the at least one user partition comprising data from at least one virtual partition of at least one user of the plurality of users;
- configure a plurality of consumer processes for each of the at least one user partition, each consumer process of the plurality of consumer processes including consumer threads processing data for virtual partitions of the subset of the plurality of virtual partitions; and
- consume at least the subset of the plurality of virtual partitions based on the plurality of consumer processes.

12. The system of claim 11, wherein the processor is further configured to:
- determine whether a schedule corresponding to the plurality of users exists; and
- based on a determination that the schedule does not exist for at least one of the plurality of users, create a scheduling entry for the at least one user, wherein the plurality of virtual partitions are published according to the schedule.

13. The system of claim 11, wherein scheduling the subset of the plurality of virtual partitions is based at least in part on a weighted stable load balancing algorithm.

14. The system of claim 11, wherein each of the at least one user partitions comprises a maximum capacity based on a maximum throughput of a consumer.

15. The system of claim 11, wherein a number of virtual partitions for each of the plurality of users is based on a total trace load and a trace load capacity of each virtual partition.

16. The system of claim 11, wherein the processor is further configured to:
- assign each of the plurality of virtual partitions to a least loaded user partition based on at least one of a trace load, a cardinality, and a partition identifier.

17. The system of claim 11, wherein the processor is further configured to:
- store schedules of the shared topic in a database.

18. The system of claim 11, wherein the processor is further configured to:
- add a new virtual partition to a schedule of the shared topic.

19. The system of claim 11, wherein the processor is further configured to:
- add a new user partition to a schedule of the shared topic.

20. A non-transitory computer-readable storage medium comprising instructions stored thereon, which when executed by one or more processors, cause the one or more processors to perform operations for virtual partitioning of data, the operations comprising:
- receiving a data stream comprising a plurality of traces, each of the plurality of traces comprising a plurality of spans from a plurality of users;
- assigning the plurality of traces of the data stream to a plurality of virtual partitions based on each user of the plurality of users, each virtual partition of the plurality of virtual partitions comprising data of a user of the plurality of users;
- publishing the plurality of virtual partitions, wherein at least a subset of the plurality of virtual partitions are scheduled on to at least one user partition with a shared topic by the plurality of traces of the data stream, the at least one user partition comprising data from at least one virtual partition of at least one user of the plurality of users;
- configuring a plurality of consumer processes for each of the at least one user partition, each consumer process of the plurality of consumer processes including consumer threads processing data for virtual partitions of the subset of the plurality of virtual partitions; and
- consuming at least the subset of the plurality of virtual partitions based on the plurality of consumer processes.

* * * * *